United States Patent Office 3,554,019
Patented Jan. 12, 1971

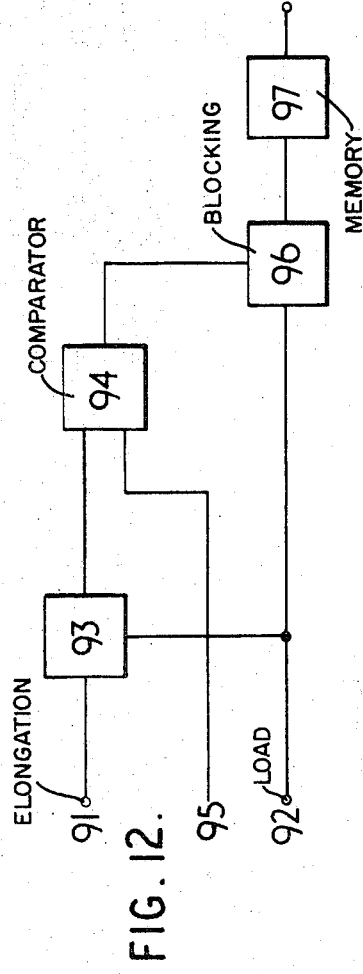
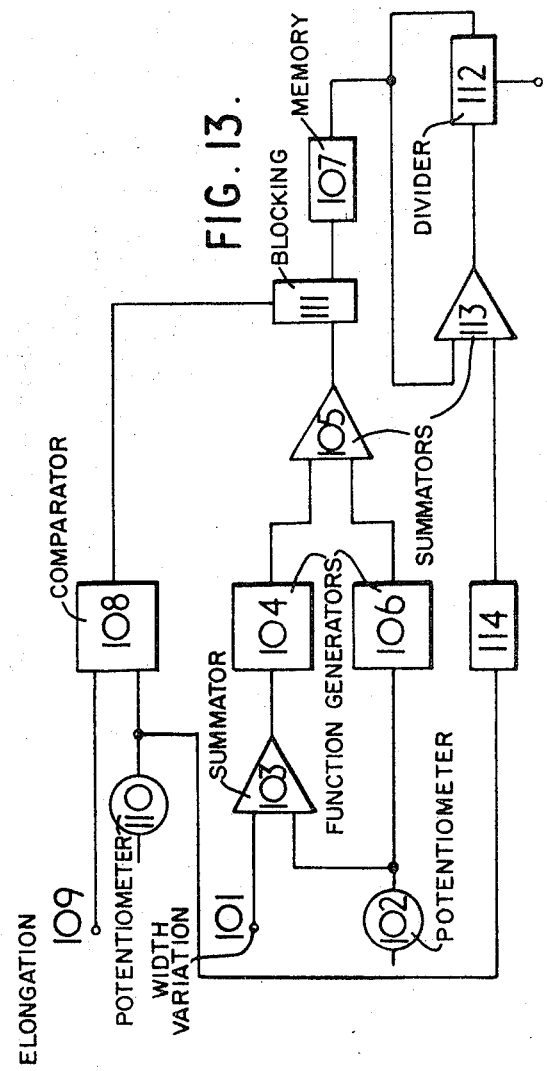
FIG. 12.
FIG. 13.

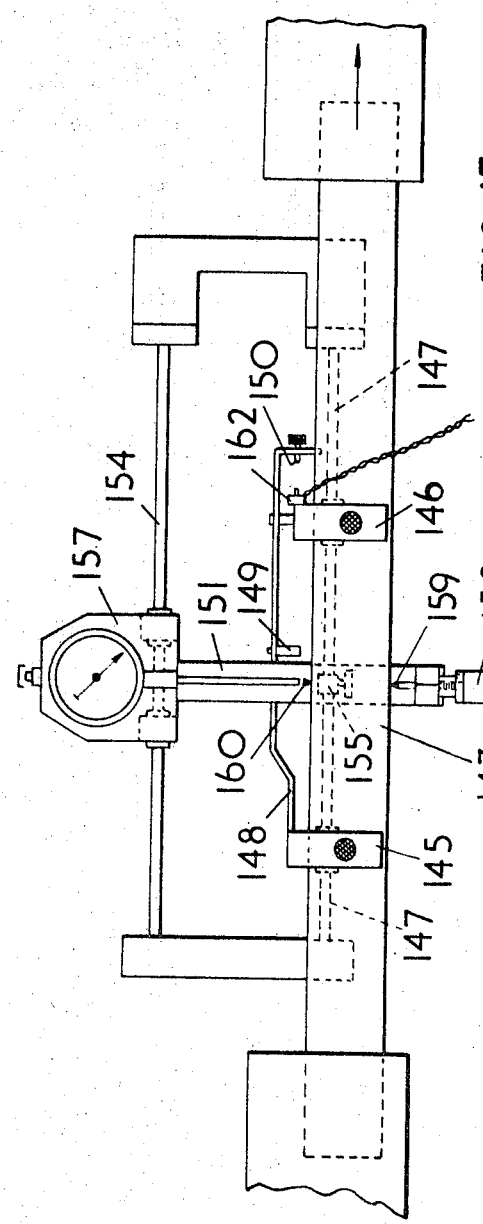
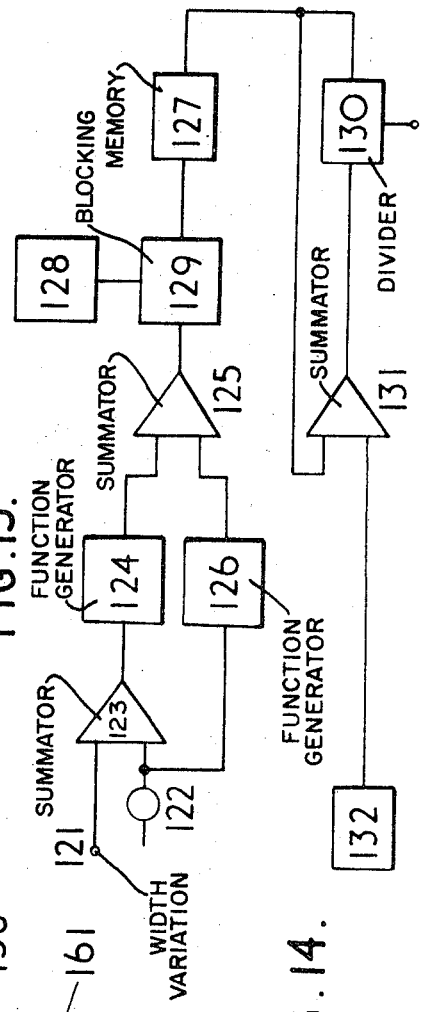
FIG. 15.
FIG. 14.

3,554,019
DETERMINATION OF STRESS STRAIN PROPERTIES OF METALLIC SUBSTANCES
Christian Marie van den Hove, Bressoux, Leonard Francois Lilet, Herstal, Paul Andre Cosse, Liege, and Maurice Augustin Wybo, Fexhe-le-haut-Clocher, Belgium, assignors to Centre National de Recherches Metallurgiques, Brussels, Belgium, a Belgian company
Filed May 17, 1968, Ser. No. 730,164
Claims priority, application Luxembourg, May 18, 1967, 53,693; Dec. 29, 1967, 708,839; Mar. 7, 1968, 711,852
Int. Cl. G01n 3/00
U.S. Cl. 73—89                                   19 Claims

ABSTRACT OF THE DISCLOSURE

A process and apparatus for the rapid determination of tensile properties of metal specimens, more particularly steel specimens in which a test speciment of the metal in question is placed under tensile test, in which appropriate detectors are employed to establish the values of specific factors of the said tensile test including the elongation of the measuring base, the load, the variation in the width of the said measuring base, these data being transmitted to a set of electronic modules built up from elements for analogical calculation, the signals delivered by the said set being transmitted to devices such as recorders or the like, by means of which the values of the characteristics sought may be obtained. The apparatus specifically comprises a tensile test machine in which is comprised, on the one hand, a tensile test machine equipped with detectors of load, elongation and variation in the width of the measuring base of the test specimen undergoing a tensile test, the detectors of elongation and of variation in width being intended in particular to allow of simultaneous measurement of the elongation and of the variation in width or of measurement of the variation in width corresponding to a specific elongation of the said measuring base for calculation of the coefficient $r$ of normal anisotropy, and an assembly of electronic modules preferably built up from elements for analogical calculation, this assembly being connected to the detectors of the said tensile test machine and being intended to evaluate the signals received from the said detectors.

---

The present invention relates to a method and device for rapid and continuous determination of the properties of metallic substances. In the case of steel, the said properties to be determined consist of the elastic limit, the strain hardening or work hardening factor $n$, the coefficient $r$ of normal anisotropy plastic strain ratio, and the like.

Tensile tests represent one of the oldest and most widespread methods employed for mechanical testing of materials.

A test of this nature renders it possible to determine the deformation of a cylindrical or prismatic test specimen, up ot breaking point, under a longitudinally applied increasing stress. In particular, a record may be obtained of the variation in the conventional elongation incurred by the test specimen as a function of the stress applied, in the form of a curve.

The conventional term "elongation" employed to describe the deformation expressed by the following formula:

$$A\% = \frac{L - Lo}{Lo} \times 100$$

in which:

$Lo$=length of the measuring base prior to application of tensile stress,
$L$=length of the measuring base after a definite elongation.

In these circumstances, the resistance to deformation R is defined as the ratio between the load F applied to the test specimen, and its initial cross-section So.

$$R = \frac{F}{So}$$

In the plastic range however, in which the deformations can no longer be likened to infinitely small quanta, as in the elastic range, a reprsentation method of this kind is obviously inadequate.

In point of fact, the resistance determined is wholly fictitious owing to the change in the cross-section of the test specimen. The deformation is not represented in rational manner moreover, since deformations under tensile stress and compressive stress cannot be compared. A compression of 100% will thus evidently correspond to infinite deformation, whereas an elongation of 100% merely doubles the length. Finally, throughout the plastic stage and more specfically after the appearance of contraction in area, the deformations vary considerably from one point of the test specimen to another, and a conventional diagram merely illustrates a mean value for these.

The elongation then becomes a function of the dimensions of the test specimen and very different results may be obtained according to the kind of test specimen employed.

These shortcomings may be eliminated, if the measurements are plotted in a system of co-ordinates different from the preceding one, and described as a "system of rational coordinates."

In a system of this nature, the true stress $\sigma$ applied to the test specimen is plotted as an ordinate:

$$\sigma = \frac{F}{S}$$

in which S is the minimum cross-section at right angles to the test specimen acted upon by the load F.

In the same system, the value $\epsilon$ of the deformation is given by:

$$\epsilon = \ln \frac{So}{S}$$

in which $So$ is the initial cross-section of the test specimen acted upon by the load F.

The outline of a tensile curve in this system of co-ordinates ($\sigma$, $\epsilon$) is referred to as the "rational tensile diagram."

It is apt to note that, in this system, the same notations may be applied in a compression test. The co-ordinates are referred to, respectively, as the rational stress $\sigma$ and as the rational elongation $\epsilon$.

Analysis of the tensile graph is a delicate matter, cannot always be executed with the percision required, and even proves to be impossible if the number of test specimens becomes relatively great and if it is wished to determine characteristics complicated to calculate.

The present invention relates to a method intended to obviate these shortcomings wtihout having to resort to a special tensile testing machine, but simply by adapting the machines normally employed at present.

A sufficiently complete list of the properties of materials, for example such as steels, would be obtained by determining:

(1) The elastic limit at $x\%$ of conventional elongation, $x$ varying from 0.01 to 0.2, (2) The upper and lower elastic limits of the flattening range of the tensile curve, (3) The strain hardening or work hardening coefficient symbolised by the letter $n$, (4) The maximum load and the rational elongation corresponding to this maximum load, (5) The normal anisotropy coefficient of the plastic deformation (plastic strain ratio) symbolised by the letter $r$.

With the method of the present invention, this set of characteristics may be calculated instantaneously and a continuous manner during a tensile test.

The method according to the present invention, in which a tensile test is applied to a test specimen of the metal in question, is characterised in that the values of specific factors of the said tensile test are determined by means of appropriate detectors, these factors including the elongation of the measuring base, the load, the variation in the width of the said measuring base, in that these data are transmitted to a set of electronic modules constructed in particular from analogical calculation elements, in that the signals emitted by the said set are transmitted to such devices as recorders for example, by means of which the values of the required characteristics may be obtained.

The values of the tensile test factors are advantageously detected in a continuous manner according to the invention, so that definite properties of the metallic substances exposed to the said tensile test may also be determined in a continuous manner.

The elastic limit at $x\%$ of elongation is generally determined on a tensile curve, by drawing a line parallel to the rectilinear part of the tensile curve, that is to say in the section in which the elastic range is operative, and in which the stresses vary according to Hooke's Law. This parallel line passes through the point having the following co-ordinates: stress=0, elongation=$x\%$. If it is assumed that the elongation is proportional to time moreover, the slope of the rectilinear part of the tensile curve may be determined by derivation of the force exerted on the test specimen as a function of time. The value of the elastic limit sought is equal to the ordinate of the point of intersection of the said straight parallel line, with the tensile curve.

In the accompanying drawings:

FIGS. 8 to 14 are further block diagrams of apparatus for carrying out the invention; and FIG. 15 is a diagrammratic view of a tensile test machine for use in accordance with the invention.

Figure 1:
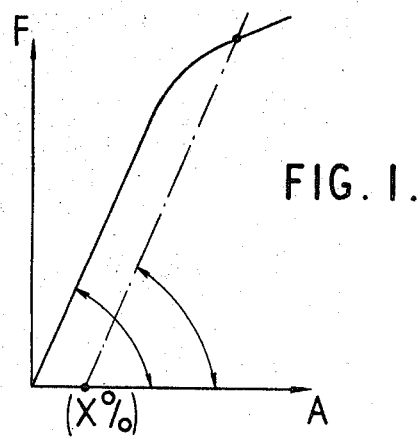
FIG. 1 is a tensile curve illustrating the derivation of the elastic limit at $x\%$ elongation as described in the preceding paragraph.
Figure 2:
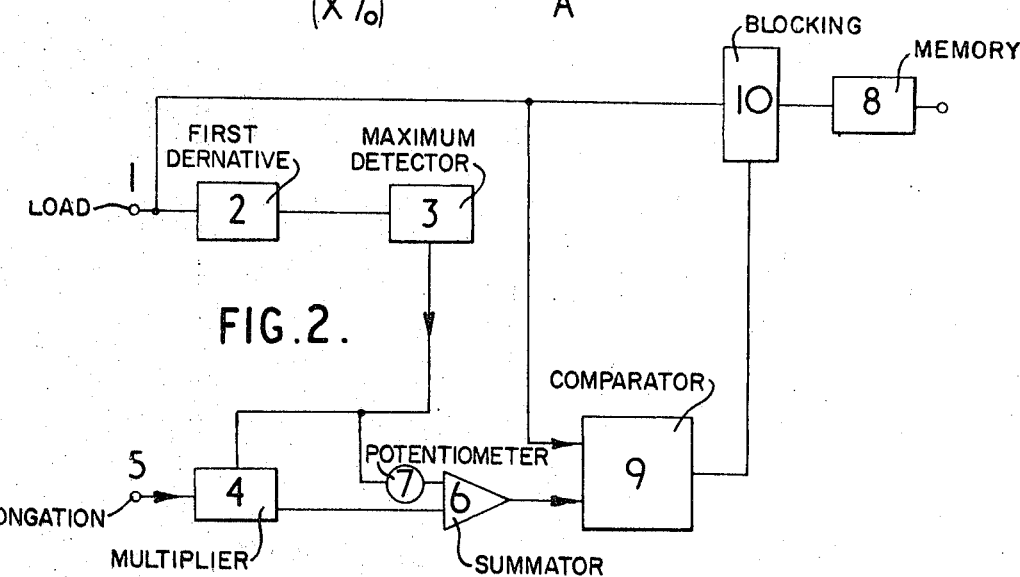
FIG. 2 is a block diagram illustrating the operation of the invention.

According to these considerations, for the purpose of determining the elastic limit at $x\%$ of elongation, the process is characterised, according to FIG. 2, in that the signal obtained at the output 1 of the load detector is transmitted to an electronic module 2 intended to form the first derivative of this signal with respect to time, in that the maximum value of this derivative is determined by means of the maximum detector module 3, in that this maximum value of the said derivative is fed into a multiplier module 4 also receiving the signal coming from an output 5 of the elongation detector, in that the product thus obtained is transmitted to a summating module 6 which, on the other hand, also receives, from a potentiometer 7, the product of the said maximum value and the percentage $x$ of elongation to which the elastic limit sought is to correspond, in that the value of the said elastic limit is determined and then stored in an analogical memory unit 8 which is linked on the one hand to the load detector output 1 and on the other hand to the summating unit 6, this determination being performed by a comparator unit 9 receiving the signals from the summating unit 6 and from the load detector 1 and which, when equality occurs between these two signals, is sensitised and energises a blocking module 10 to prevent any subsequent entry in the memory unit 8, which latter then retains the last value recorded, this value being equal to the elastic limit sought.

The term analogical memory unit is intended to describe an electronic assembly operating in the following manner: when an item of information varying with time and represented by a variable electrical potential reaches the input of this electronic assembly, this latter emits the information received, at its output, continuously but with a definite delay. This delay, referred to as the time constant, may be modified according to circumstances, and may even be reduced to a negligible value. When the input of the said assembly ceases to receive data, the final item of information received prior to interruption is retained at its output.

Figure 3:
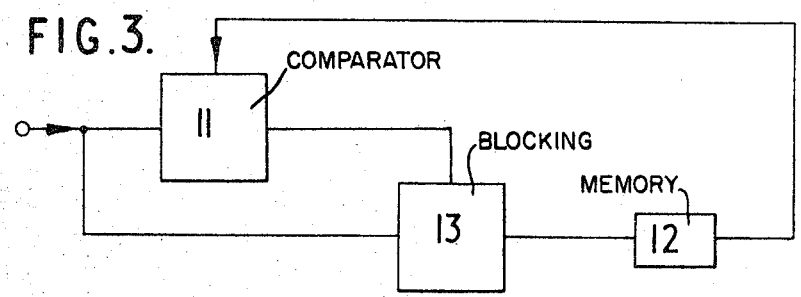
FIG. 3 is a further block diagram illustrating the operation of one feature of the invention.

Preferably, the determination of the maximum value of the first derivative is characterised, according to FIG. 3, in that the signal representative of the first derivative is fed into a comparator module 11 on the one hand and into an analogical memory unit 12 on the other hand, the latter retransmitting the signal to the said comparator 11 with a short delay, so that on the occurrence of change of sign of the resulting potential difference at the input of the comparator 11, the latter is sensitised and energises a blocking module 13 to prevent any subsequent entry in the memory unit 12 which then retains the last value recorded, this value corresponding to the required maximum value of the said first derivative.

So that the first derivation with respect to time of the signal transmitted by the load detector may be calculated correctly, the speed of the tensile testing machine should be very low and the zone of elastic deformation should be of sufficient length.

According to the invention, electronic filtering is advantageously applied to the signals employed to calculate the first derivation with respect to time of the output signal of the load detector, since this eliminates certain interference fluctuations of the said signals.

Another method of determining the elastic limit at $x\%$ of elongation consists of determining the intersection of the tensile curve with a straight line parallel to the rectilinear part of the said tensile curve, passing through the point having the following co-ordinates: stress=0, elongation=$x\%$, and whose gradient has a value statistically determined beforehand by tests on a batch of similar test specimens.

Figure 4:
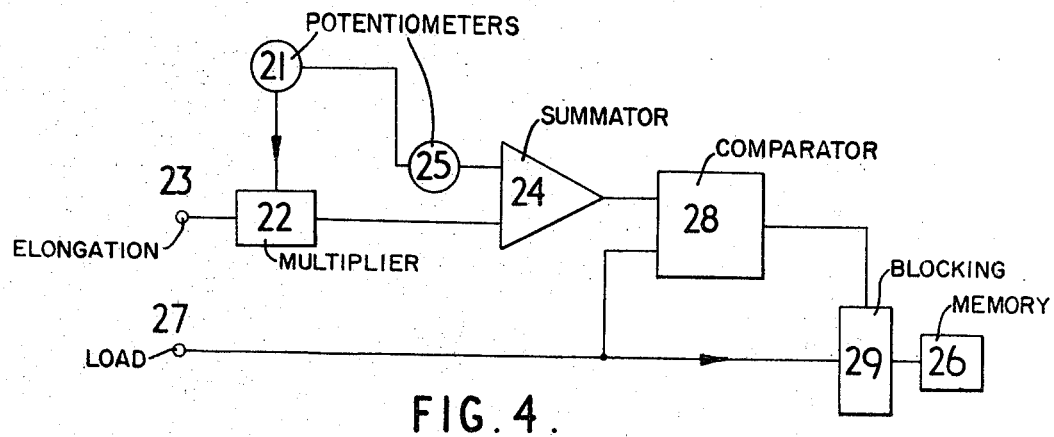
FIG. 4 is a block diagram of a system alternative to the arrangement of FIG. 1.

According to this second method, the determination of the elastic limit at $x\%$ of elongation is characterised, according to FIG. 4, in that a potentiometer 21 is employed to set up the fixed chosen value of the gradient of the straight line parallel to the rectilinear part of the tensile curve, in that this value is fed to the multiplier module 22 which, as the second multiplication term, also receives the output signal from the elongation detector 23, in that the product thus obtained is transmitted to a summating module 24 which, on the other hand, also receives—through the potentiometer 25—the product of the said fixed chosen value of the gradient with the percentage $x$ of elongation to which the value of the said required elastic limit is to correspond, in that the value of the said elastic limit is determined and then stored in an analogical memory unit 26 which is linked, on the one hand, to the load detector 27 and, on the other hand, to the summator 24, this determination being carried out by means of a comparator 28 receiving the signals from the summator 24 and from the load detector 27, and which—when equality occurs between these two signals—is sensitised and energises a blocking module 29 to prevent any subsequent entry in the memory unit 26 which then retains the last value recorded, that is to say that of the elastic limit required.

It may be pointed out that a decoupling device is installed between the two potentiometers 21 and 25 of FIG. 4, so that the mechanical setting up of the said potentiometers is relatively precise.

Figure 5:
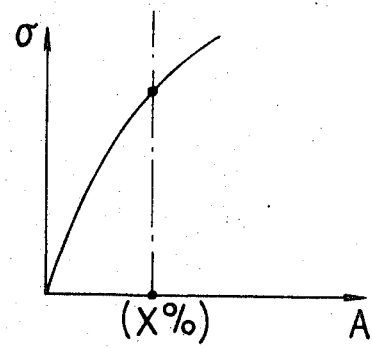
FIG. 5 is a curve illustrating the basis of a further alternative.

A third method of determining the elastic limit at $x\%$ of elongation, illustrated in FIG. 5, consists of determining the intersection between the tensile curve and a straight vertical line passing through the point having the following co-ordinates: stress=0, elongation=$x\%$. The value of the elastic limit required is equal to the ordinate of the said point of intersection.

Figure 6:
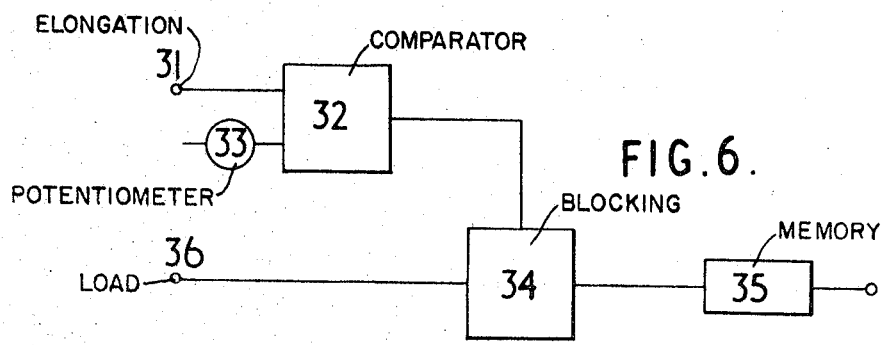
FIG. 6 is a block diagram of apparatus for carrying out this alternative.

According to this third method, the determination of the elastic limit at $x\%$ of elongation is characterised, according to FIG. 6, in that the signal obtained at the output of the elongation detector 31 is transmitted to a comparator module 32 also connected to a potentiometer 33 set to the said value $x\%$. When equality occurs between the value of the elongation and the required percentage, the said comparator 32 is sensitised to energise a blocking module 34 to prevent any subsequent entry in the memory unit 35 of the signals obtained by means of the load detector 36, the said memory unit 35 then retaining the last value recorded, that is to say that of the load for which the elongation of the test specimen is equal to $x\%$.

Given that the elastic limit is determined as a rule for extremely small values of elongation, for example $0.01 \leqslant x \leqslant 0.2$, an elongation detector having a small range is preferably employed according to the invention, to measure small elongations.

In particular, this mode of operation may be required to allow for the departure from linearity of the detector which is of the order of plus or minus 0.5% for detectors of the inductive type.

Figure 7:
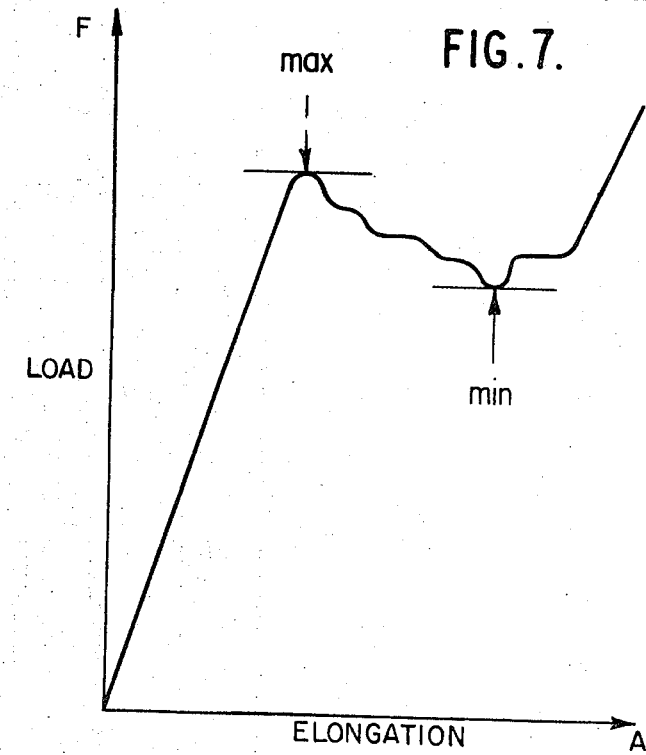
FIG. 7 is a tensile curve.

The upper and lower elastic limits of the flattening range of the tensile curve are illustrated in FIG. 7.

Figure 8:
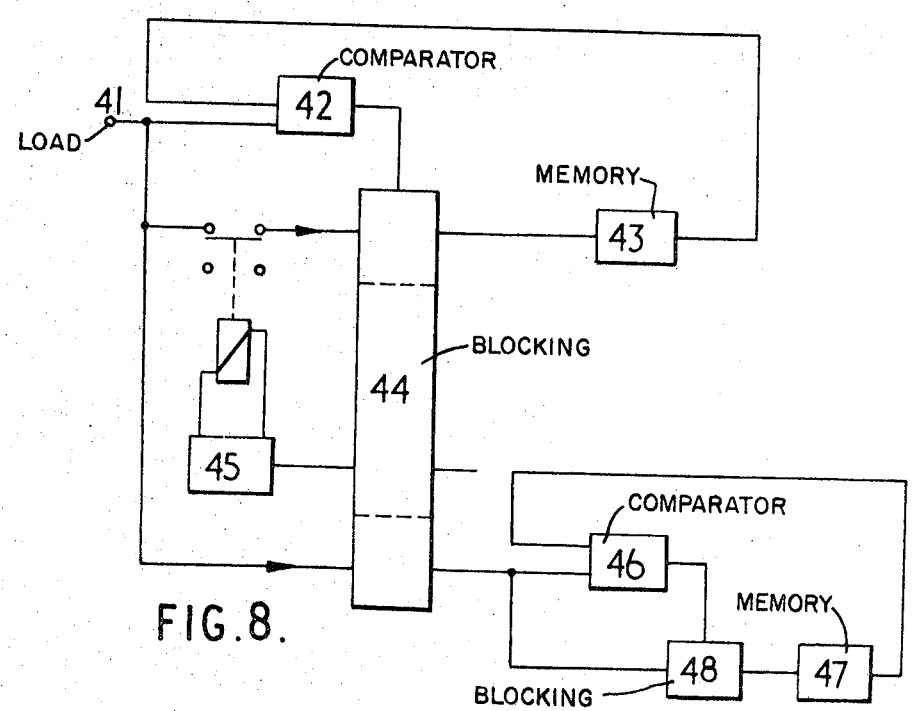

According to the mode of operation illustrated in FIG. 8, the method is characterised in that the output signal of the load detector 41 is transmitted, on the one hand, to a comparator 42 and, on the other hand, to an analogical memory unit 43, the latter being connected to the said comparator 42, this comparator 42 receiving the signal from the unit 43 with a slight delay after the direct signal from the detector 41, in that when the difference between these two signals incurs a change of sign, the comparator 42 is sensitised and energises a blocking module 44 to prevent any entry from passing into the memory unit 43, this latter retaining the last load value recorded, that is to say that of the upper elastic limit, in that the action of the blocking module 44 immediately or a few seconds later results in the disconnection by means of an appropriate device 45 of the circuit 42, 43, 44 from that of the load detector 41 in such manner that a second maximum of the elastic limit, higher than the first, is no longer determined, in that the action of the same blocking module 44 also has the result of connecting the output of the load detector 41 to a circuit similar to the first in such manner that the signal obtained from the said load detector 41 is transmitted to a comparator 46 on the one hand, and to an analogical memory unit 47 on the other hand, the latter being connected to the said comparator 46, this comparator 46 receiving the load signal from the unit 47 with a short delay after the direct signal from the detector 41, in that when the difference between these two signals incurs a change of sign, the comparator 46 is sensitised and energises a blocking module 48, which prevents any subsequent entry in the memory unit 47, this latter retaining the last load value recorded, that is to say that of the lower elastic limit.

To prevent determination of a second maximum greater than the first chosen to represent the value of the upper elastic limit, the detection of this first maximum is advantageously performed, according to the invention, within a range of a few percent of elongation only.

When the tensile curve does not possess a maximum in the range of the few percent of elongation chosen, an appropriate device connected therefore between the load detector 41 and the memory unit 43 comes into action, in such manner that the said memory unit 43 provides a value equal to zero at the end of the test.

To prevent cancellation of the output signal of the memory unit 47 when the test specimen breaks, determination of the lower elastic limit is carried out within a predetermined range of elongation, and the connection between the load detector 41 and the said memory unit 47 is interrupted when the limit of this range is reached.

The present invention equally relates to a process for determining the strain hardening or work hardening coefficient $n$ characterising the increase in the strength of the metal during deformation, and in particular renders it possible to assess the suitability of metal sheets or plates for drawing.

This process is based on the fact that the rational tensile curve may be expressed in the form of an equation such as $\delta = \alpha \epsilon^n$ for a greater number of materials and in particular for mild steel and ferrite steels, $\alpha$ being a specific constant for the material. Owing to this fact, the rational tensile curve plotted to logarithmic co-ordinates (ln $\sigma$, ln $\epsilon$) is a straight line whose slope is equal to the coefficient $n$.

This coefficient $n$ may thus be determined, by considering two points of the said straight line in the area of validity of the law $\sigma = \alpha \epsilon^n$, according to the expression $$n_{2,1} = \frac{\ln \sigma_2 - \ln \sigma_1}{\ln \epsilon_2 - \ln \epsilon_1} = k_{2,1} (\ln \sigma_2 - \ln \sigma_1)$$

or, more generally $$n_{p,p-1} = k_{p,p-1} (\ln \sigma_p - \ln \sigma_{p-1})$$

and taking the mean $$n = \frac{1}{p-1} (n_{2,1} + n_{3,2} + \ldots + n_{p,p-1})$$

Figure 9:
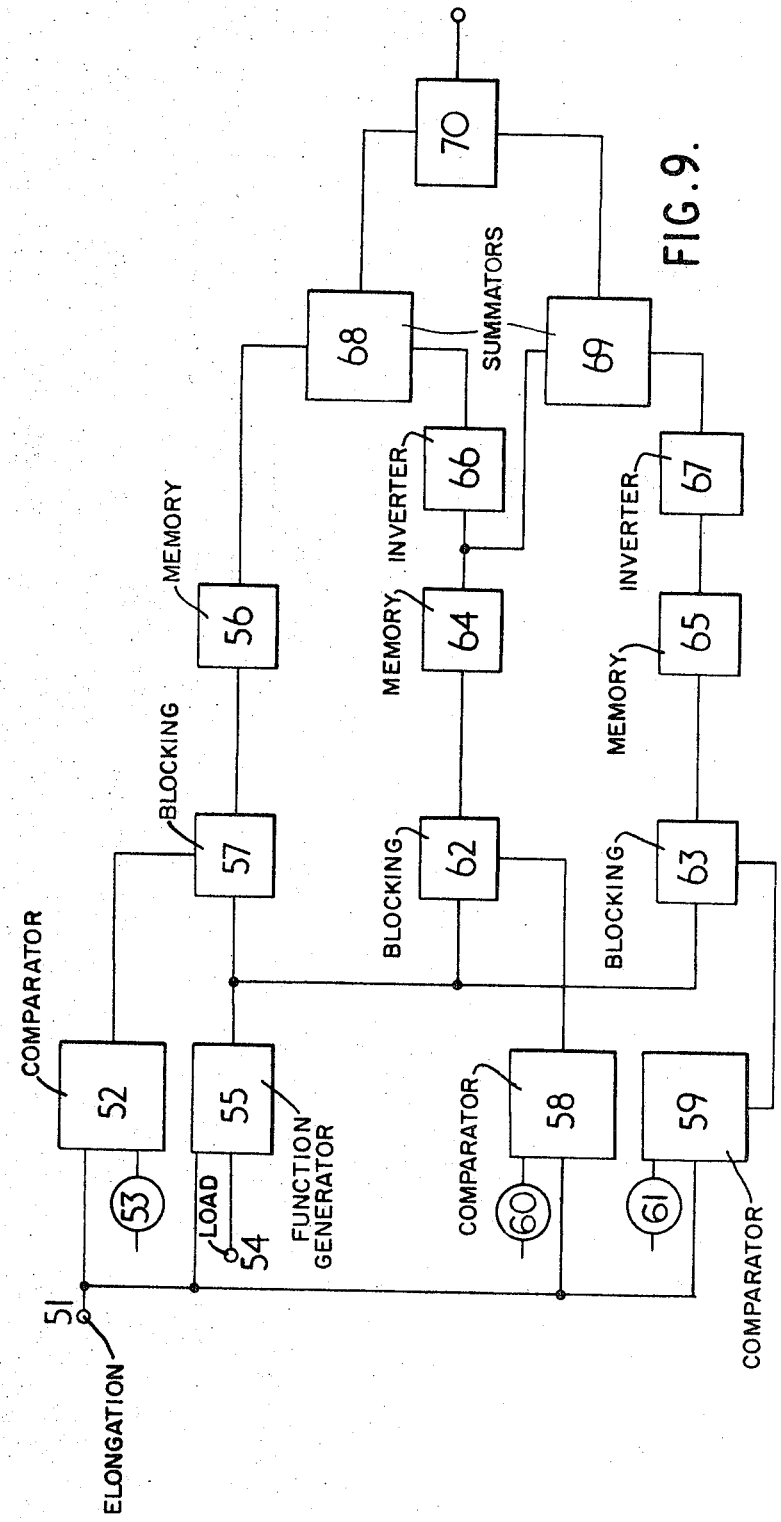

Based on these considerations, the method for determining $n$ of the invention is characterised, according to FIG. 9, in that the signal obtained at the output of the elongation detector 51 is transmitted to a comparator 52 which on the other hand also receives the indication of the elongation of a point chosen in the tensile curve, through a potentiometer 53, in that a signal representative of the term ln $\sigma$ is obtained at the output of the electronic assembly 55 from the load 54 and elongation 51 detectors in combination with the said electronic assembly, in that the term ln $\sigma$ is stored in an analogical memory unit 56, in that when the value of the elongation derived from the detector 51 coincides with that set up in the potentiometer 53, the comparator 52 is sensitised and energies a blocking module 57 to prevent any subsequent entry in this memory unit 56 which then retains the last value recorded in ln $\sigma$, that is to say that corresponding to the value of the elongation of the point selected on the tensile curve, in that the number $p$ of comparators 52, 58, 59, of potentiometers 53, 60, 61, of blocking modules 57, 62, 63 and of memory units 56, 64, 65 correspond to that of the points selected on the said tensile curve, in that a signal characteristic of the terms ln $\sigma_1$, ln $\sigma_2$, ln $\sigma_3$ relating to each of the said selected points is thus obtained at the outputs of the said memory units 56, 64, 65, and in that these signals are combined by means of inverters 66, 67, summators 68, 69 and 70, to obtain the coefficient $n_{2,1}=k_{2,1}$ (ln $\sigma_2$–ln $\sigma_1$) at the output of the summator 68, and the coefficient $n_{3,2}=k_{3,2}$ (ln $\sigma_3$–ln $\sigma_2$) at the output of the summator 69, these coefficients applying to pairs of corresponding points for example 1, 2; 2, 3 selected on the said tensile curve, to obtain, at the output of an electronic assembly 70, the mean coefficient $$n=\frac{1}{p-1}(n_{2,1}+n_{3,2}+ \ldots +n_{p,p-1})$$

applying to these points (for example, $$n=\frac{n_{2,1}+n_{3,2}}{2}$$

is obtained at the output of the electronic assembly 70).

Another method of determining the coefficient $n$ is based on the following definition:

$$n=\frac{d \ln F/dt}{d \ln \epsilon/dt}+\epsilon$$

in which $\epsilon$ is the rational elongation and is equal to the Napierian logarithm of $1+A$, that is to say $\epsilon=$ ln $(1+A)$ A being the conventional elongation and being equal to $$\frac{L-Lo}{Lo}\%$$

with

Lo=initial length of the base
L=length of the base after a specific elongation.

$$\frac{d \ln F}{dt}$$

represents the derivative with respect to time of the Napierian logarithm of the load F.

$$\frac{d \ln \epsilon}{dt}$$

represents the derivative with respect to time of the Napierian logarithm of the elongation.

Figure 10:
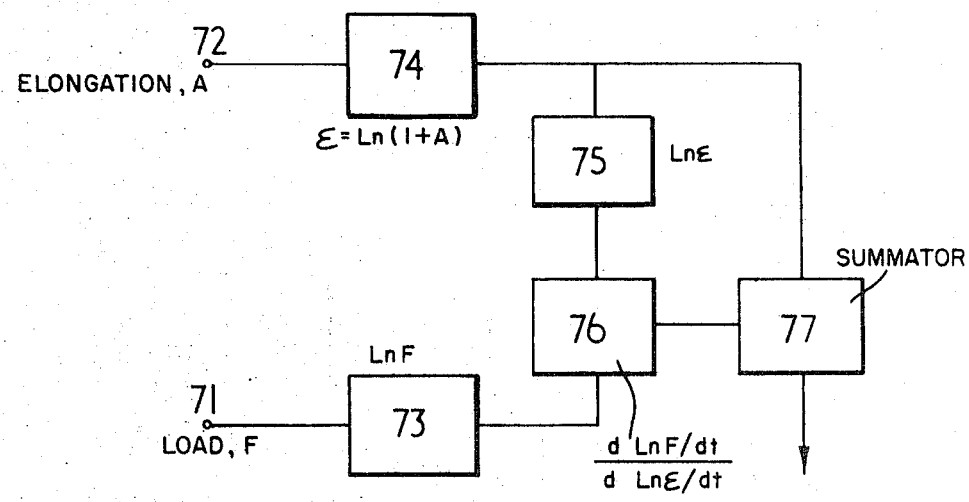

This last method, for determining the strain hardening or work hardening coefficient $n$ is characterised, according to FIG. 10, in that the signal obtained at the output of the load detector 71 is transmitted to a function generator 73 delivering the expression ln F, in that the signal obtained at the output of the detector 72 for the elongation A is transmitted to a function generator 74 delivering the expression $\epsilon=$ln $(1+A)$, in that this last signal is fed into another function generator 75 delivering the expression ln $\epsilon$, in that the electronic module 76 on the one hand receives the signal representative of the expression ln F and on the other hand that which is representative of the expression ln $\epsilon$, this electronic module delivering the expression $$\frac{d \ln F/dt}{d \ln \epsilon/dt}$$

obtained by derivation and then by division, in that the the signal produced by the said electronic module 76 is fed to a summator 77 which on the other hand receives the signal produced by the said function generator 74, in that the said summator 77 produces at its output the expression $$\frac{d \ln F/dt}{d \ln \epsilon/dt}+\epsilon$$

which represents the work hardening coefficient $n$.

To calculate the coefficient in according to the above method, the tensile test is carried out at relatively high speed according to the invention.

The value of the coefficient $n$ calculated in this way represents a constant, in principle, for a great number of materials, in a portion of the plastic range in which the load is smaller than maximum load.

As a result, the expression $$\frac{d \ln F/dt}{d \ln \epsilon/dt}+\epsilon$$

may be recorded as a function of the elongation, and the value of the coefficient $n$ in the useful range may be evaluated from the recording obtained.

Moreover, to make allowance for certain fluctuations appearing in the recording and which may be caused, on the one hand, by a lack of uniformity of the test specimen and material in question, and on the other hand by certain shortcomings of the detection system or of the overall electronic layout, the instantaneous value of the expression $$\frac{d \ln F/dt}{d \ln \epsilon/dt}+\epsilon$$

is integrated as a function of time, during a period corresponding to the useful elongation range, by means of an electronic assembly which supplies a recorded mean value of the coefficient $n$ at the end of the test.

It is of interest to be able to determine the maximum load and the corresponding elongation during a tensile test.

Considerable flattening in the vicinity of the maximum is observed in the majority of cases in the tensile curves recorded by conventional means: a definite degree of uncertainty prevails as a rule concerning its precise location. As a result, there is some difficulty in determining the maximum load with accuracy and it is observed moreover that for a slight error in the said maximum load (ordinate) a much greater error creeps into the corresponding elongation (abscissa).

The present invention also relates to a method whereby this lack of precision may be reduced substantially. It is based on comparing a function with the same but slightly delayed function.

Figure 11:
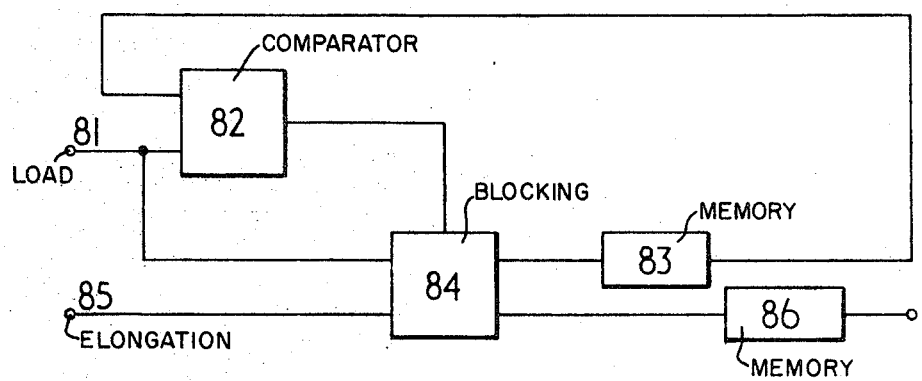

This method in which the maximum load and the corresponding elongation are determined, is characterised in that, according to FIG. 11, the signal obtained at the output of the load detector 81 is transmitted, on the one hand, to a comparator module 82, and on the other hand to an analogical memory unit 83 which retransmits the signal received to the said comparator 82 with a short delay, in that when the difference of the two signals received by the comparator 82 incurs a change in sign, the said comparator is sensitised and energises a blocking module 84 preventing any subsequent entry in the memory unit 83 which then retains the last value recorded, that is to say that of the maximum load, in that at the same time, the blocking module 84 interrupts the circuit connecting the elongation detector 85 to an analogical memory unit 86, so that the latter may retain the value of the elongation corresponding to the maximum stress.

A comparator 82 of very high sensitivity, of the order of one millivolt, is employed to determine the maximum load and the corresponding elongation.

Another method of determining the maximum load is based on the fact that in a tensile test, the rational deformation $\epsilon$ measured at maximum load is equal to the strain hardening or work hardening coefficient $n$.

On this basis, the process for determining the maximum load and the corresponding elongation is characterised in that, as illustrated in FIG. 12, the signals obtained from the elongation detector 91 and the load detector 92 are transmitted to an electronic assembly 93 which processes these data in such manner as to calculate the coefficient $n$, in that the signal issuing from the electronic assembly 93 is fed to a comparator module 94, in that the said comparator module also receives through the circuit 95 a signal representative of the instantaneous rational elongation $\epsilon$, in that when the said elongation $\epsilon$ becomes equal to the coefficient $n$, that is to say when the load is a maximum, the comparator 94 is sensitised and energises a blocking module 96 situated in the circuit connecting the load detector 92 to an analogical memory unit 97, with the result of preventing any subsequent entry in the said memory unit 97 which when retains the last stress value recorded, that is to say that of the maximum load, the corresponding elongation being equal to the coefficient $n$ calculated by the electronic assembly 93.

The determination of the coefficient $n$ carried out by the electronic assembly 93, is performed for an elongation of the test specimen comprised between two predetermined values, for example between 8% and 16%, and at all events for a smaller elongation than that corresponding to maximum load.

Another possibility is to determine the coefficient of normal anisotropy of plastic deformation strain ratio symbolised by the letter $r$.

The importance of determining the coefficient $r$ resides in that the deformations occurring in deep drawing operations are correlated to the said coefficient $r$.

This coefficient $r$ is defined as being the ratio between the rational deformations in length and in width of a test specimen acted upon longitudinally by a progressively increasing force. The result thereof is that:

$$r = \frac{\epsilon_1}{\epsilon_2}$$

Measuring the variation in thickness of a sheet or plate specimen is difficult and lacks precision however, particularly since the cross-section of the test specimen does not remain rectangular after testing under tension. Measurement of variations in thickness has thus been replaced by measurement of the elongations and variations in width. The expression for the value of the coefficient of normal anisotropy strain ratio is then modified in the following manner:

$$r = \frac{\ln \frac{lo}{l}}{\ln \frac{L \times l}{Lo \times lo}} = \frac{\ln lo - \ln l}{\epsilon + \ln l - \ln lo}$$

in which:

$lo$ = width of the measuring base prior to testing
$l$ = width of the measuring base after a definite elongation
$Lo$ = length of the measuring base prior to testing
$L$ = length of the measuring base after a definite elongation
$\epsilon$ = rational deformation in length after a definite elongation
$\ln$ = symbol of the Napierian logarithm The application of this formula is justified subject to the condition that the deformations in length as well as width are uniform within the measuring base. This is the reason why the coefficient $r$ is normally determined at an appropriate degree of elongation, of the order of 20%, since the steels intended for drawing or deep drawing as a rule have a uniformly distributed elongation greater than this value of 20%.

Based on such considerations, the method for determining the coefficient $r$ is characterised, according to FIG. 13, in that two signals, one obtained from the detector 101 measuring variation in the width of the measuring base and the other from the potentiometer 102 whose indication represents the value $lo$ of the width of the said measuring base prior to testing, are fed into an electronic summating module 103, in that the signal issuing from the said summating module 103 is transmitted to a function generator 104 producing the term $\ln l$, in that the signal representative of the said term $\ln l$ is fed after a change in sign into the summator module 105 which is also supplied with the term $\ln lo$ by means of the function generator 106 supplied by the potentiometer 102, so that the summator 105 delivers a signal at its output which is representative of the term $\ln lo - \ln l$ which is fed to the analogical memory unit 107, in that any subsequent entry in the said memory unit 107 is stopped at the instant in which the elongation of the measuring base corresponds to the appropriate value selected, in that this last result is obtained by means of the comparator 108 which on the one hand receives the signal obtained from the elongation detector 109 and on the other hand the signal coming from the potentiometer 110 and representing the selected elongation value for calculation of the coefficient $r$, this comparator 108 being sensitised when these two signals reach equality and then energising a blocking module 111 situated between the mtmory unit 107 and the summating module 105, so that the value of the term $\ln lo - \ln l$ corresponding to the elongation selected may be retained in this memory unit 107, in that the signal representative of this last term is fed, on the one hand, to a divider module 112 and on the other hand, after change of sign, to a summator module 113 also supplied with the value of the rational elongation $\epsilon$ determined from the potentiometer 110 and the function generator 114, in that on issuing from the outlet of the summator 113, the signal representative of the expression $\epsilon + \ln l - \ln lo$ is transmitted to the divider module 112, which then provides a signal representing the expression $$\frac{\ln lo - \ln l}{\epsilon + \ln l - \ln lo}$$

which is equal to the coefficient $r$.

According to a modification given that in a tensile test, the rational deformation $\epsilon$ measured at maximum load is equal to the strain hardening or work hardening coefficient $n$, it may be of interest to determine the coefficient $r$ of normal anisotropy of plastic deformation strain ratio in the same conditions, that is to say when the load is a maximum.

According to the foregoing modification, the method for determining the coefficient $r$ is characterized, according to FIG. 14, in that two signals, one obtained from the detector 121 for the variation in width of the measuring base and the other from the potentiometer 122 whose indication represents the value $lo$ of the width of the said measuring base prior to the test, are introduced into an electronic summator module 123, in that the signal issuing from the said summator 123 is transmitted to a function generator 124 producing the term $\ln l$, in that the signal representative of the said term $\ln l$ is fed after a change in sign into the summator module 125 which also receives the term $\ln lo$ from the function generator 126 supplied by the potentiometer 122, a signal representative of the term $\ln lo - \ln 1$ thus being obtained at the output of the summator 125, which signal is fed into the analogical memory unit 127, in that any subsequent entry in the said memory unit is prevented at the instant in which the load applied by the tensile test machine has reached its maximum value, this result being obtained from the electronic assembly 128 for determining the said maximum load which actuates a blocking module 129 connected between the summator 125 and the said memory unit 127, so that the value of the term $\ln lo - \ln l$ corresponding to maximum load may be retained in this memory unit 127, in that the signal representative of this last term is transmitted, on the one hand to a divider module 130 and on the other hand, after a change in sign, to a summator module 131, into which has been fed the value of the rational elongation $\epsilon$ corresponding to maximum load and determined by means of an electronic assembly 132, in that the signal representative of the expression $\epsilon + \ln l - \ln lo$ corresponding to maximum load is transmitted from the output of the summator 131 to the divider module 130, which then delivers a signal representing the expression $$\frac{\ln lo - \ln l}{\epsilon + \ln l - \ln lo}$$

which is equal to the coefficient $r$.

Finally, one mode of operation according to the invention of a blocking module consists of feeding the signal received into a relay coil, which when fed with an energising signal, actuates a mechanical contact breaker interpolated in the circuit which is to be interrupted.

The references made in the preceding text to a signal obtained at the output of the load detector, should be understood to refer to a signal representing one or the other of the following terms:

(1) F, that is to say, the load applied to the specimen. In this case, the detector is a simple device and the signal received at the inlet is transmitted direct to the output without modification.

(2) $F/So$, that is to say, the load divided by the initial cross-section of the test specimen.

In this case, which is that most generally applicable, the load detector forms part of an electronic assembly, also comprising a divider module and a potentiometer whereof the set-up voltage is representative of $So$. The divider module thus receives the signals representing $F$ and $So$, performs division of the first by the second and transmits a signal characteristic of $F/So$ at its output.

(3) $\sigma=F/S$, that is to say the true stress.

In this case, the load detector forms part of an electranic assembly which additionally comprises not only a potentiometer and a divider module as in (2), but also multiplier module intended on the one hand to receive the signal representative of $F/So$ and on the other hand the signal representative of $(l+A)$, so that a signal representative of the expression $$\frac{F}{So}(l+A)$$

that is to say of $\sigma$, may be obtained at the output of the said multiplier module.

The present invention also relates to a device for application of the methods described in the foregoing.

The device according to the present invention is characterised in that it comprises, a tensile test machine equipped with detectors of load, elongation and variation in the width of the measuring base of the test specimen undergoing a tensile test, the detectors of elongation and of variation in width being intended in particular to render it possible, for calculation of the coefficient $r$ of normal anisotropy (strain ratio), to perform simultaneous measurement of the elongation and of the variation in width, or to perform the measurement of the variation in width corresponding to a definite elongation of the said measuring base, and an assembly of electronic modules, preferably built up from elements for analogical calculation, this assembly being connected to the detectors of the tensile test machine and being intended to evaluate the signals received from the said detectors.

In certain special cases, in which it is necessary to perform a great number of measurements quickly, which applies in the case of production checks, it is desirable to have a small tensile test machine well suited to the work it is to perform, available in situ. This recommendation is applicable, for example, in the case in which it is intended to evaluate the suitability of metal sheet stock for deep drawing, on the basis of the coefficient $r$ of normal anisotropy (strain ratio) and of the strain hardening or work hardening coefficient $n$, a small tensile test machine of this kind, preferably a horizontal one, being shown in FIG. 15.

It comprises a mechanism for setting the elongation of a test specimen 143, consisting of two displaceable markers 145 and 146 fastened on the test specimen 143 and whereof the displacements are caused by the deformation of the specimen under tensile test, the distance between these two markers 145 and 146 at all times indicating the length of the measuring base, the first marker 145 being equipped with a lever 148 bearing two abutments or stops 149 and 150 situated at either side of the marker 146 and whereof the positions adjustable on the lever 148 limit the distance separating the markers 145 and 146 to a minimum corresponding to the length of the measuring base prior to tensile testing, and to a maximum corresponding to the length of the measuring base after undergoing a definite degree of elongation.

The test machine further comprises a device for determining the deformation in width of one and the same cross-section of the test specimen under tensile test, comprising a device displaceable along the rods 147 and 154, anchorable by a set screw device 155, and a measuring stage consisting of an angle 151 bearing a measuring apparatus 157–158 equipped with a spring and two feelers 159 and 160 intended to establish contact with the edges of the test specimen, this contact being maintained by means of blade springs acting as connectors between the said measurement stages and the said displaceable device.

Various modifications may be made within the scope of the invention.

We claim:

1. A method of testing a metal to determine the elastic limit at $x\%$ elongation, comprising the steps of subjecting a specimen of the metal to continuous tensile test, measuring the load on the specimen, measuring the elongation of the specimen, transmitting a signal representing the load to an electronic module which forms the first derivative of the said signal with respect to time, transmitting the said first derivative to a maximum detector module which detects the maximum value of the said first derivative, transmitting a signal representing the said maximum value and a signal representing the elongation to a multiplier module to obtain a product, transmitting the product to a summator module, transmitting a signal representing the said maximum value to a potentiometer which forms the product of the said maximum value and the percentage $x$, transmitting the last-mentioned product to the said summator module, transmitting the signal obtained from the summator module to a comparator, transmitting a signal representing the load to the said comparator, transmitting a signal representing the load through a blocking module to a memory unit which retains the last signal received, and energising the blocking module, when the two signals transmitted to the comparator become equal, to present any subsequent transmission to the memory unit, the last signal received by the memory unit representing the elastic limit sought.

2. A method as claimed in claim 1, in which the said maximum value of the said first derivative is detected by a method comprising the steps of transmitting a signal representing the said first derivative to one input of a comparator module having two inputs, transmitting a signal representing the said first derivative through a blocking module to a memory unit which retains the last signal received, retransmitting the signal representing the said first derivative from the memory unit to the other input of the comparator with a short delay, and energising the blocking module, when the voltage applied to the two inputs of the comparator changes sign, to prevent any subsequent entry into the memory unit, the last signal received by the memory unit representing the said maximum value.

3. A method as claimed in claim 1, including the step of elongating the specimen very slowly, the range of elastic deformation of the specimen being sufficiently great that the said first derivative is calculated correctly.

4. A method as claimed in claim 1, including the step of electronically filtering the signals transmitted to the electronic module which forms the said first derivative to eliminate interference fluctuations.

5. A method of testing a metal to determine the elastic limit at $x\%$ elongation, comprising the steps of subjecting a specimen of the metal to continuous tensile test, measuring the load on the specimen, measuring the elongation of the specimen, transmitting a signal representing a predetermined gradient of the rectilinear part of the tensile curve to one input of a multiplier module having two inputs, transmitting a signal representing the elongation to the other input of the multiplier module to obtain a product, transmitting the said product to one input of a summator module having two inputs, transmitting a signal representing the said predetermined gradient to a potentiometer which forms the product of the said predetermined gradient and the percentage $x$, transmitting the last-mentioned product to the other input of the summator module, transmitting a signal representing the load through a blocking module to a memory unit which retains the last signal received, transmitting the signal obtained at the output of the summator module to a comparator, transmitting a signal representing the load to the said comparator, and energising the blocking module, when the two signals transmitted to the comparator become equal, to prevent any subsequent transmission to the memory unit, the last signal received by the memory unit representing the elastic limit sought.

6. A method of testing a metal to determine the upper and lower elastic limits of the flattening range of the tensile curve, comprising the steps of subjecting a specimen of the metal to continuous tensile test, measuring the load on the specimen, transmitting a signal representing the load to one input of a comparator having two inputs responsive to different signals, transmitting a signal representing the load to a memory unit which retains the last signal received, retransmitting the signal from the memory unit to the other input of the comparator with a short delay, energising a blocking module, when the voltage applied to the two inputs of the comparator changes sign, to prevent any subsequent transmission to the memory unit and to allow subsequent transmission of a signal representing the load to a second comparator and a second memory unit, subsequently transmitting the signal representing the load to one input of the second comparator, having two inputs responsive to different signals representing values of the load lower than that represented by said last signal received by the first-mentioned memory unit, and to the second memory unit, which retains the last signal received, retransmitting the signal from the second memory unit to the other input of the second comparator with a short delay, and energising a second blocking module when the voltage applied to the two inputs of the second comparator changes sign, to prevent any subsequent transmission to the second memory unit, the signals retained in the two memory units representing the upper and lower elastic limits of the tensile curve respectively.

7. A method as claimed in claim 6, including the step of determining the first maximum of the load, selected to represent the upper elastic limit, as indicated by a change in sign of the voltage applied to the two inputs of the first-mentioned comparator, within a range of elongation of a few percent only, to avoid determining a second maximum greater than the first.

8. A method as claimed in claim 6, including causing the first-mentioned memory unit to retain a zero signal at the end of the tensile test if the tensile curve does not have a maximum of the load, as indicated by a change in sign of the voltage applied to the two inputs of the first-mentioned comparator, within a selected range of a few percent of elongation.

9. A method as claimed in claim 6, including determining the lower elastic limit within a predetermined range of elongation to avoid cancellation of the output signal of the second memory unit when the specimen fractures, and interrupting the signal to the second memory unit when the limit of the said predetermined range is reached.

10. A method of testing a metal to determine the strain hardening or work hardening coefficient $n$, comprising the steps of subecting a specimen of the metal to continuous tensile test, measuring the load on the specimen, measuring the elongation of the specimen, transmitting a signal representing the elongation to one input of each of a number $p$ of comparators, each having two inputs, transmitting a signal representing a given elongation to the other input of each comparator, transmitting a signal representing the elongation and a signal representing the load to an electronic assembly producing a signal representing the term ln o, transmitting the signal produced by the electronic assembly to each of a number $p$ of memory units, each memory unit corresponding to a comparator, interrupting the signal to a memory unit when the signals transmitted to the two inputs of the corresponding comparator becomes equal, whereby the memory units retain signals characteristic of the terms ln $o_1$, ln $o_2$, ln $o_3$ . . . ln $o_p$, corresponding to the given elongations transmitted to the compartors, transmitting the signals from the memory units to elecronic modules which produce signals representing the coefficients $n_{21}=K_{21}$ (ln $o_2$–ln $o_1$) . . . $n_{p,p-1}$ (ln $o_p$–ln $o_{p-1}$), relating to pairs of given elongations, and transmitting the last-mentioned signals to a further electroic assembly which emits a signal representing the mean coefficient $$n=\frac{l}{p-l}(n_{21}+n_{32}+\ldots+n_{p,p-1})$$

11. A method of testing a metal to determine the strain hardening or work hardening coefficient $n$, comprising the steps of subecting a specimen of the metal to continuous tensile test, measuring the load on the specimen, measuring the elongation of the specimen, transmitting a signal representing the load F to a first function generator providing the term ln F, transmitting a signal representing the elongation A to a second function generator providing the term $\epsilon=\ln(l+A)$, transmitting a signal representing $\epsilon$ to a third function generator providing the term ln $\epsilon$, transmitting a signal representing the term ln F and a signal representing the term ln $\epsilon$ to an electronic module providing the expression $$\frac{d\ln F/dt}{[d\ln \epsilon/dt}$$

transmitting the signal produced by the said electronic module and the signal produced by the said second function generator to a summator module which provides a signal representing the expression $$\frac{d\ln F/dt}{d\ln \epsilon/dt}+\epsilon$$

which represents the coefficient $n$.

12. A method as claimed in claim 11, including performing the tensile test at a relatively high speed.

13. A method as claimed in claim 11, including recording the expression $$\frac{d\ln F/dt}{d\ln \epsilon/dt}+\epsilon$$

as a function of elongation, and evaluating the value of the coefficient $n$ in the useful range from the recording obtained.

14. A method as claimed in claim 13, including integrating the instantaneous value of the expression $$\frac{d\ln F/dt}{d\ln \epsilon/dt}+\epsilon$$

15. A method of testing a metal to determine the maximum load and the corresponding elongation, comprising the steps of subjecting a specimen of the metal to continuous tensile test, measuring the load on the specimen, measuring the elongation of the specimen, transmitting a signal representing the load through a blocking module to a first memory unit which retains the last signal received, transmitting a signal representing the elongation through the said blocking module to a second memory unit which retains the last signal received, transmitting a signal representing the load to one input of a comparator having two inputs, retransmitting the signal transmitted to the first memory unit with a short delay to the other input of the comparator, and energising the blocking module, when the voltage applied to the two inputs of the comparator changes sign, to prevent any subsequent transmission to the first and second memory units, the signals retained in the first and second memory units representing the maximum load and the corresponding elongation respectively.

16. A method of testing a metal to determine the maximum load and the corresponding elongation, comprising the steps of subjecting a specimen of the metal to continuous tensile test, measuring the load on the specimen, measuring the elongation of the specimen, transmitting a signal representing the load through a blocking module to a memory unit which retains the last signal received, transmitting a signal representing the elongation A and a signal representing the load to an electronic assembly which calculates the coefficient $n$ of work hardening, transmitting the signal from the electronic assembly to one input of a comparator having two inputs, transmitting a signal representing the rational elongation $\epsilon = \ln(l+A)$ to the other input of the comparator, and energising the blocking module, when the signals received at the two inputs of the comparator become equal, to prevent any subsequent transmission to the memory unit, the signal retained by the memory unit representing the maximum load, and the corresponding elongation being equal to the coefficient $n$ calculated by the electronic assembly.

17. A method as claimed in claim 16, including calculating the coefficient $n$ of work hardening by said electronic assembly for an elongation of the test specimen comprised between two predetermined values smaller than that corresponding to maximum load.

18. A method of testing a metal to determine the normal isotropy coefficient $r$ of plastic deformation at a selected elongation, comprising the steps of subjecting a specimen of the metal to continuous tensile test, measuring the elongation of the specimen, measuring the variation in width of the measuring base of the specimen, transmitting a signal representing the variation in width and a signal representing the initial width $lo$ of the measuring base prior to testing to a summator module, to obtain a signal representing the instantaneous width $l$ of the measuring base, transmitting the signal obtained from the summator module to a function generator producing the term $\ln l$, transmitting a signal representing $lo$ to a second function generator producing the term $\ln lo$, transmitting a signal representing the $\ln l$ and a signal representing $\ln lo$ to a second summator module producing a signal representing the expression $\ln lo - \ln l$, transmitting the signal from the said second summator module through a blocking unit to a memory unit which retains the last signal received, transmitting a signal representing the elongation and a signal representing the said selected elongation to a comparator, energising the said blocking module, when the signals transmitted to the comparator become equal, to prevent any subsequent transmission to the memory unit, which retains a signal representing the value of $\ln lo - \ln l$ corresponding to the said selected elongation, transmitting a signal representing the value of the rational elongation $\epsilon$ corresponding to the said selected elongation to one input of a third summator module having two inputs, transmitting the signal from the memory unit to the other input of the said third summator module which produces a signal representing the expression $\epsilon + \ln l - \ln lo$, and transmitting the signal from the memory unit and the signal from the said third summator to a divider module which produces a signal representing the expression $$\frac{\ln lo - \ln l}{\epsilon + \ln l - \ln lo} = r$$

at the said selected elongation.

19. A method of testing a metal to determine the normal isotropy coefficient $r$ of plastic deformation at maximum load, comprising the steps of measuring the load on the specimen, measuring the elongation of the specimen, measuring the variation in width of the measuring base of the specimen, transmitting a signal representing the variation in width and a signal representing the initial width $lo$ of the measuring base prior to testing to a summator module, to obtain a signal representing the instantaneous width $l$ of the measuring base, transmitting the signal obtaned from the summator module to a function generator producing the term $\ln l$, transmitting a signal representing $lo$ to a second function generator producing the term $\ln lo$, transmitting a signal representing $\ln l$ and a signal representing $\ln lo$ to a second summator module producing a signal representing the expression $\ln lo - \ln l$, transmitting the signal from the said second summator module through a blocking module to a memory unit which retains the last signal received, transmitting a signal representing the load to an electronic assembly which actuates the said blocking module when the load reaches a maximum, so that the said memory unit retains the value of the expression $\ln lo - \ln l$ corresponding to maximum load, transmitting the signal from the memory unit and a signal representing the value of the rational elongation $\epsilon$ corresponding to the maximum load to a third summator module producing a signal representing the expression $\epsilon + \ln l + \ln lo$ corresponding to maximum load, transmitting the signal from the said third summator module and the signal from the said memory unit to a divider module producing a signal representing the expression $$\frac{\ln lo - \ln l}{\epsilon + \ln l - \ln lo} = r$$

at maximum load.

References Cited
UNITED STATES PATENTS

| | | | |
|---|---|---|---|
| 3,076,603 | 2/1963 | Gruber | 73—89X |
| 3,352,151 | 11/1967 | Yoshida et al. | 73—89 |
| 2,726,542 | 12/1955 | Hyde | 73—88.5X |

JERRY W. MYRACLE, Primary Examiner